(12) United States Patent
Pollock et al.

(10) Patent No.: US 9,856,698 B2
(45) Date of Patent: Jan. 2, 2018

(54) SELF-PROPELLED, TOWABLE CORING APPARATUS

(71) Applicant: Utilicor Technologies Inc., Toronto (CA)

(72) Inventors: Edward Marshall Pollock, Toronto (CA); Andrew Leslie Pollock, Toronto (CA); Pasquale Colangelo, Toronto (CA)

(73) Assignee: UTILICOR TECHNOLOGIES INC., Toronto (CA)

( * ) Notice: Subject to any disclaimer, the term of this patent is extended or adjusted under 35 U.S.C. 154(b) by 103 days.

(21) Appl. No.: 14/865,351

(22) Filed: Sep. 25, 2015

(65) Prior Publication Data

US 2017/0089138 A1    Mar. 30, 2017

(51) Int. Cl.
| | |
|---|---|
| *E21B 15/00* | (2006.01) |
| *E21B 7/02* | (2006.01) |
| *B60D 1/145* | (2006.01) |
| *E01C 23/09* | (2006.01) |
| *B60D 1/02* | (2006.01) |
| *B60D 1/155* | (2006.01) |
| *B60D 1/46* | (2006.01) |
| *B60D 1/00* | (2006.01) |

(52) U.S. Cl.
CPC ............... *E21B 7/027* (2013.01); *B60D 1/02* (2013.01); *B60D 1/145* (2013.01); *B60D 1/155* (2013.01); *B60D 1/46* (2013.01); *E01C 23/094* (2013.01); *E21B 7/024* (2013.01); *B60D 2001/008* (2013.01)

(58) Field of Classification Search
CPC .............................. E01C 23/094; E21B 7/027
See application file for complete search history.

(56) References Cited

U.S. PATENT DOCUMENTS

| | | |
|---|---|---|
| 2,856,155 A | 10/1958 | Putt |
| 3,525,404 A | 8/1970 | Newman et al. |
| 3,527,309 A | 9/1970 | Rassieur |
| 3,754,604 A | 8/1973 | Inaba et al. |
| 4,645,084 A | 2/1987 | Deike |
| 4,809,788 A | 3/1989 | Nelson |
| 4,925,358 A | 5/1990 | Cook |

(Continued)

FOREIGN PATENT DOCUMENTS

WO        8504918 A1    11/1985

OTHER PUBLICATIONS

What is Keyhole Technology?, www.utilicor.ca, accessed Oct. 31, 2012.

(Continued)

*Primary Examiner* — John J Kreck
(74) *Attorney, Agent, or Firm* — Bereskin & Parr LLP/S.E.N.C.R.L., s.r.l.

(57) ABSTRACT

A self-propelled, towable coring apparatus includes a base structure having at least one primary wheel. A rotary spindle drives a coring element. A support mechanism supports the rotary spindle and displaces the rotary spindle upwardly and downwardly relative to a ground surface. At least one engine is supported by the base structure and provides power to the at least one primary wheel to propel the apparatus, and to the rotary spindle to drive the coring element. A tow member is connected to the base structure for trailering the apparatus by a towing vehicle.

20 Claims, 13 Drawing Sheets

(56) References Cited

U.S. PATENT DOCUMENTS

| | | | |
|---|---|---|---|
| 5,470,131 A * | 11/1995 | Nolan | E01C 23/094 |
| | | | 299/41.1 |
| 5,490,755 A | 2/1996 | Billotte | |
| 5,662,176 A | 9/1997 | Madgwick et al. | |
| 6,668,471 B1 * | 12/2003 | Cook | E02F 9/085 |
| | | | 37/410 |
| 7,128,165 B2 | 10/2006 | McGivery | |
| 7,757,780 B2 | 7/2010 | Pollock et al. | |
| 8,327,950 B2 | 12/2012 | Pollock et al. | |
| 2005/0207841 A1 * | 9/2005 | Holl | E01C 23/088 |
| | | | 404/94 |
| 2008/0000652 A1 | 1/2008 | Johnson | |
| 2008/0277131 A1 | 11/2008 | Pollock et al. | |

OTHER PUBLICATIONS

How the Keyhole Process Works, www.utilicor.ca, accessed Oct. 31, 2012.
Benefits and Applications, www.utilicor.ca, accessed Oct. 31, 2012.
Minicor-2 Coring Attachment, www.utilicor.ca, accessed Jul. 3, 2014.
Minicor-2 Core Value, Brochure, www.utilicor.ca, accessed Dec. 4, 2015.
Trailicor Rover Coring Unit, Features, www.utilicor.ca, accessed Dec. 4, 2015.
Trailicor Rover Coring Unit, Brochure, www.utilicor.ca, accessed Dec. 4, 2015.

* cited by examiner

SELF-PROPELLED, TOWABLE CORING APPARATUS

FIELD

The present disclosure relates to excavating apparatuses for coring or drilling concrete or paved ground surfaces.

BACKGROUND

The following paragraphs are not an admission that anything discussed in them is prior art or part of the knowledge of persons skilled in the art.

U.S. Pat. No. 4,925,358 (Cook) describes a small, self-contained portable back-hoe having a wheeled frame with a towing tongue for over-the-road trailering. Pivoted outriggers are connected to the back and a third support is secured to the front of the frame. Cylinder units are coupled to position the supports for digging and in raised position for trailering. The bucket and articulated boom assembly is affixed to the frame with a vertical pivot and includes cylinder units for digging operation thereof. An operator station and a hydraulic power supply source or system is secured to the front of the frame. A special hydraulic supply is integrated into the front framework. The back-hoe boom assembly and operating assembly are balanced about the single axle for convenient positioning. The bucket assembly and three-point support are arranged to minimize the tipping of the frame as a result of the digging forces. A gasoline driven high efficiency industrial-type pump is connected to the cylinder units with a filter and the suction side. A reservoir is built into the front frame structure and includes a watertower element to eliminate air from the hydraulic liquid. The reservoir reliably removes the air from the liquid to avoid pump malfunction.

U.S. Pat. No. 5,490,755 (Billotte) describes a self-propelled boom loader arranged as a hybrid between a trailer and a self-propelled vehicle. The loader has a carriage with a pair of independently controllable drive wheels powered by hydraulic drive motors and a free turning third wheel caster spaced from the drive wheels in a tricycle configuration. A hydraulic loader such as a knuckle boom loader is carried on the carriage on a turntable mount. The loader has an on-board hydraulic pump providing operational hydraulic pressure to the boom and turntable, which pressure is controllably divertable to operate the drive motors via controls in the loader cab. The loader is adapted for maneuvering in close quarters and has stabilizing outriggers. The drive wheels have rotationally disengageable hubs for freewheeling, and the carriage has a tow hitch coupleable to a tow vehicle for trailering, the wheels and hitch being mounted on the carriage such that the third wheel is lifted from the ground during trailering, for over the road transport.

U.S. Pat. No. 6,668,471 (Cook et al.) describes a multi-functional, self-contained towable backhoe apparatus adapted for direct over-the-road trailering by a towing vehicle, having a support frame having a front and a rear, and a trailering hitch attached to the front. Wheels support the frame at the front and the rear. The rear wheels can function as drive wheels. A backfill blade is movably attached to the rear of the frame. An articulated arm assembly is pivotably mounted on the rear of the frame. A stabilizer with a street pad, a spade, or both, can be secured to the front of the frame for stabilizing the apparatus while in a digging position. The movable backfill blade is capable of movement to a raised position for supporting the articulated arm during transport and movement to at least one lowered ground-engaging position capable of stabilizing the apparatus, of earth moving, or a combination thereof. One end of the articulated arm is adapted for attachment of a tool, including a digging bucket, a pavement breaker, an auger, a grapple, or a fork. The self-contained towable backhoe apparatus can also have a pad on the backfill blade capable of cushioning the articulated arm assembly.

INTRODUCTION

The following paragraphs are intended to introduce the reader to the more detailed description that follows and not to define or limit the claimed subject matter.

According to an aspect of the present disclosure, a self-propelled, towable coring apparatus is described. The apparatus includes: a base structure having a forward end and a rearward end; at least one primary wheel arranged to support the base structure; a rotary spindle operable for driving a coring element; a support mechanism connected to the forward end of the base structure, the support mechanism supporting the rotary spindle and operable to displace the rotary spindle upwardly and downwardly relative to a ground surface; at least one engine supported by the base structure and operable to provide power to (i) rotate the at least one primary wheel to propel the apparatus, and (ii) rotate the rotary spindle to drive the coring element; and a tow member connected to the rearward end of the base structure for trailering the apparatus by a towing vehicle.

The apparatus may include a bracket fixed to the rearward end of the base structure, and the tow member may include a proximal end that is mounted to the bracket, a distal end spaced apart from the proximal end, and a hitch connector fixed to the distal end. The at least one primary wheel may be arranged towards the forward end of the base structure, and the apparatus may further include at least one secondary wheel arranged towards the rearward end of the base structure. The at least one secondary wheel may be coupled to the tow member and, in a driving configuration, the at least one primary wheel and the at least one secondary wheel may be positioned to engage the ground surface. The apparatus may include first and second lateral arms fixed to opposing sides of the tow member, and the at least one secondary wheel may include a first secondary wheel connected to the first lateral arm and a second secondary wheel connected to the second lateral arm. The first and second lateral arms may be fixed to the tow member intermediate of the proximal and distal ends, and the first and second secondary wheels may be swivelly connected to the first and second lateral arms, respectively. The tow member may be pivotally mounted to the bracket and may be pivotable from the driving configuration downwardly to a towing configuration in which the at least one secondary wheel is positioned to be spaced apart from the ground surface.

The rotary spindle may be displaceable by the support mechanism to a raised position in which the rotary spindle is maintained at a height above the ground surface greater than a height of the coring element. The apparatus may include a coring guard supported by the support mechanism, and in the raised position a bottom edge of the coring guard may be maintained at least 18" above the ground surface. The support mechanism may include: a first support member fixed to the forward end of the base structure; a second support member slidably mounted to and supported by the first support member, and the rotary spindle may be coupled to the second support member. The apparatus may include a third support member slidably mounted to and supported by the second support member, and the rotary spindle may be fixed to the third support member. The apparatus may include a safety member for engaging the first, second and third support members in a locked position to maintain the rotary spindle in the raised position. The safety member may be spring loaded and engages tabs of each of the first, second and third support members. The base structure may define a driver area having positioned therein a seat, and the safety member may accessible from within the driver area.

The apparatus may include first and second primary axles positioned on first and second sides of the base structure, respectively, and the at least one primary wheel may include first and second primary wheels mounted to the first and second primary axles, respectively. Each of the first and second primary wheels may include a hub operable between an unlocked state in which the wheel is permitted to rotate freely and a locked state in which the wheel is not permitted to rotate. The apparatus may include an electric over hydraulic disc braking system coupled to the hubs for selectively locking the hubs relative to primary axles. The apparatus may include at least one water tank positioned proximate to the primary axles and generally symmetric about a vertical longitudinal center line of the base structure.

The base structure may define a driver area having positioned therein a seat, a first control device for controlling driving and steering of the apparatus, a second control device for controlling operation of the support mechanism, a display, and/or a camera operable to capture images of an area forward of the base structure and communicate the images to the display. The apparatus may include a first emergency stop input device accessible from within the driver area, and a second emergency stop input device positioned in proximity to the coring element. The apparatus may include a plurality of stabilizers operable between a stabilizing position in which each engages the ground surface and a raised positioned in which each is disengaged from the ground surface.

The apparatus may include at least one hydraulic motor that is powered by the at least one engine for rotating the at least one primary wheel to propel the apparatus. The apparatus may include at least one hydraulic motor that is powered by the at least one engine for rotating the rotary spindle to drive the coring element. The support mechanism may include a hydraulic actuator that is powered by the at least one engine for displacing the rotary spindle upwardly and downwardly. The at least one engine may be located towards the rearward end of the base structure and may be operable to provide power to (i) at least one hydraulic motor for rotating the at least one primary wheel to propel the apparatus, (ii) at least one hydraulic motor for rotating the rotary spindle to drive the coring element, and (iii) a hydraulic actuator of the support mechanism for displacing the rotary spindle upwardly and downwardly. The at least one engine may be operable to provide power to move a plurality of stabilizers between a stabilizing position in which each engages the ground surface and a raised positioned in which each is disengaged from the ground surface. The apparatus may include a hydraulic fluid tank supported by the base structure and positioned proximate to the at least one engine. The at least one engine may consist of a single internal combustion engine.

According to an aspect of the present disclosure, a self-propelled, towable coring apparatus is described. The apparatus includes: a base structure having a forward end and a rearward end; first and second primary wheels for supporting the base structure and arranged towards the forward end; a rotary spindle operable for driving a coring element; a support mechanism including a first support member fixed to the forward end of the base structure, and a second support member slidably mounted to and supported by the first support member, the rotary spindle coupled to the second support member and displaceable upwardly and downwardly relative to a ground surface; an engine supported by the base structure and operable to provide power to (i) rotate the at least one primary wheel to propel the apparatus, (ii) rotate the rotary spindle to drive the coring element, and (iii) displace the rotary spindle upwardly and downwardly; a tow member pivotally mounted to the rearward end of the base structure for trailering the apparatus by a towing vehicle; and first and second secondary wheels for supporting the base structure and coupled to the tow member. The tow member is pivotable between a driving configuration in which the first and second secondary wheels are positioned to engage the ground surface and a towing configuration in which the first and second secondary wheels are positioned to be spaced apart from the ground surface.

According to an aspect of the present disclosure, a method of operating a self-propelled, towable coring apparatus is described. The apparatus includes a rotary spindle, a coring element drivable by the rotary spindle, and a tow member. The method includes: attaching the tow member to a towing vehicle; driving the towing vehicle while trailering the apparatus to a work site; detaching the tow member from the towing vehicle; propelling the apparatus within the work site to align a cutting axis of the coring element with a location on a ground surface to be cored; rotating the rotary spindle to drive the coring element while lowering the coring element relative to the ground surface, thereby forming a core; reattaching the tow member to the towing vehicle; and driving the towing vehicle while trailering the apparatus from the work site.

The step of propelling the apparatus may include rotating at least one primary wheel of the apparatus with at least one motor of the apparatus. The method may include, before the step of propelling the apparatus, pivoting the tow member upwardly to a driving configuration in which at least one secondary wheel engages the ground surface. The method may include, before the step of reattaching the tow member, pivoting the tow member downwardly from the driving configuration to a towing configuration in which the at least one secondary wheel is spaced apart from the ground surface and the tow member is positioned for attachment to a hitch of the towing vehicle. The method may include, before the steps of driving the towing vehicle, engaging a safety member to maintain the rotary spindle at a raised position above the ground surface. The method may include operating an engine of the apparatus to provide power to (i) rotate at least one primary wheel to propel the apparatus, (ii) rotate the rotary spindle to drive the coring element, and (iii) displace the rotary spindle upwardly and downwardly.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods are described below to provide an example of an embodiment of each claimed invention. No example described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, and the applicant(s), inventor(s) and/or owner(s) do not intend to abandon, disclaim or dedicate to the public any such invention by its disclosure in this document.

Figure 1:
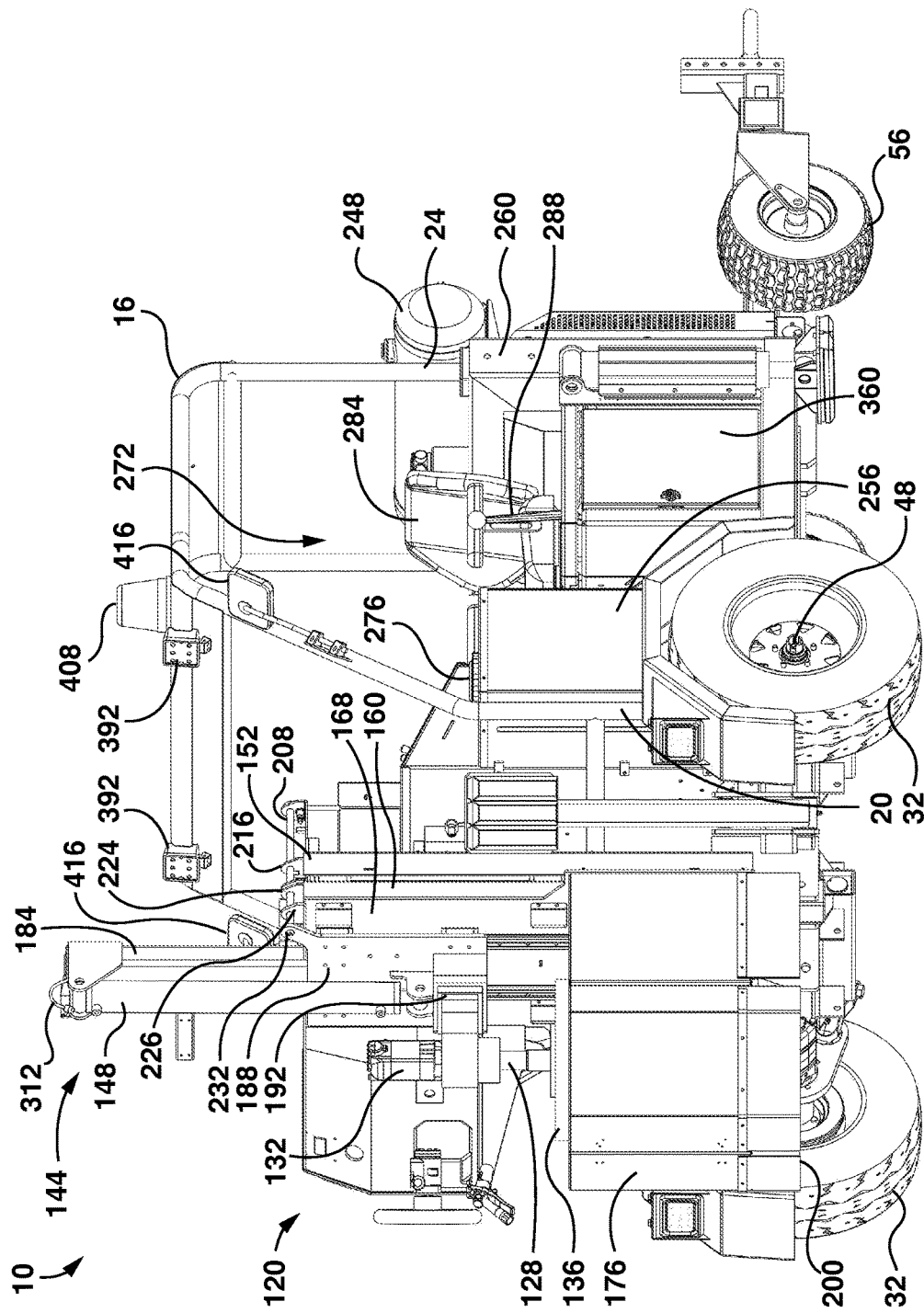
FIG. 1 is a front, left side perspective view of an example of a self-propelled, towable coring apparatus in a towing configuration.

Referring to FIG. 1, an example of a self-propelled, towable coring apparatus is shown generally at reference numeral 10. In the example illustrated, the apparatus 10 includes a base structure 16, which acts as base to which other components of the apparatus 10 may be assembled. In some examples, the base structure 16 may include a protected roll cage or roof and may resemble the truck frame of a forklift. The base structure 16 includes a generally forward end 20 and generally rearward end 24. It will be appreciated that terms used to describe the orientation of the apparatus 10, such as front, rear, forward and rearward, will change depending on whether the apparatus 10 is being driven or towed. For the sake of consistency, the terms of orientation used herein correspond to the apparatus 10 being in the driving configuration.

Figure 2:
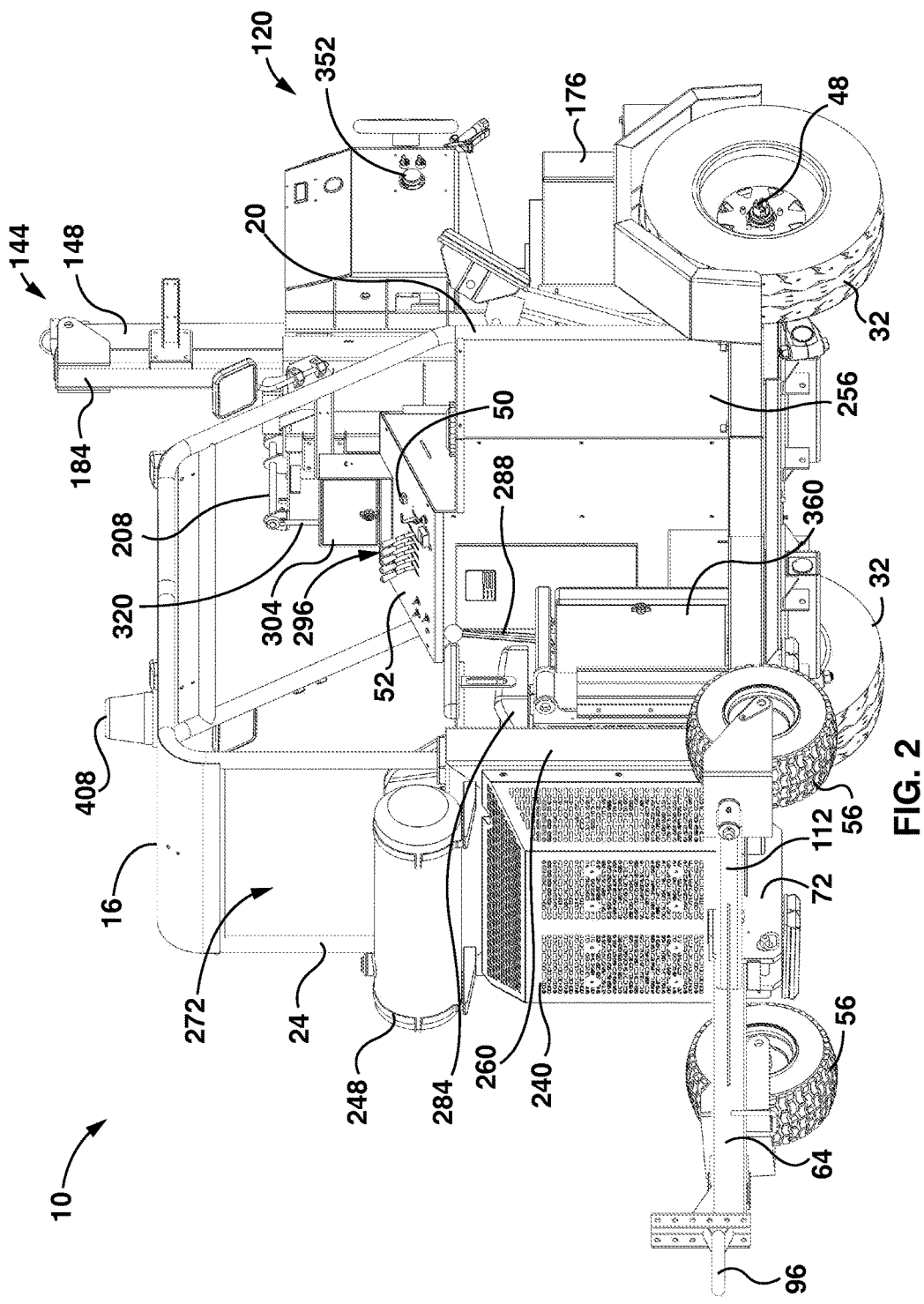
FIG. 2 is a rear, right side perspective view of the apparatus in the towing configuration.
Figure 4:
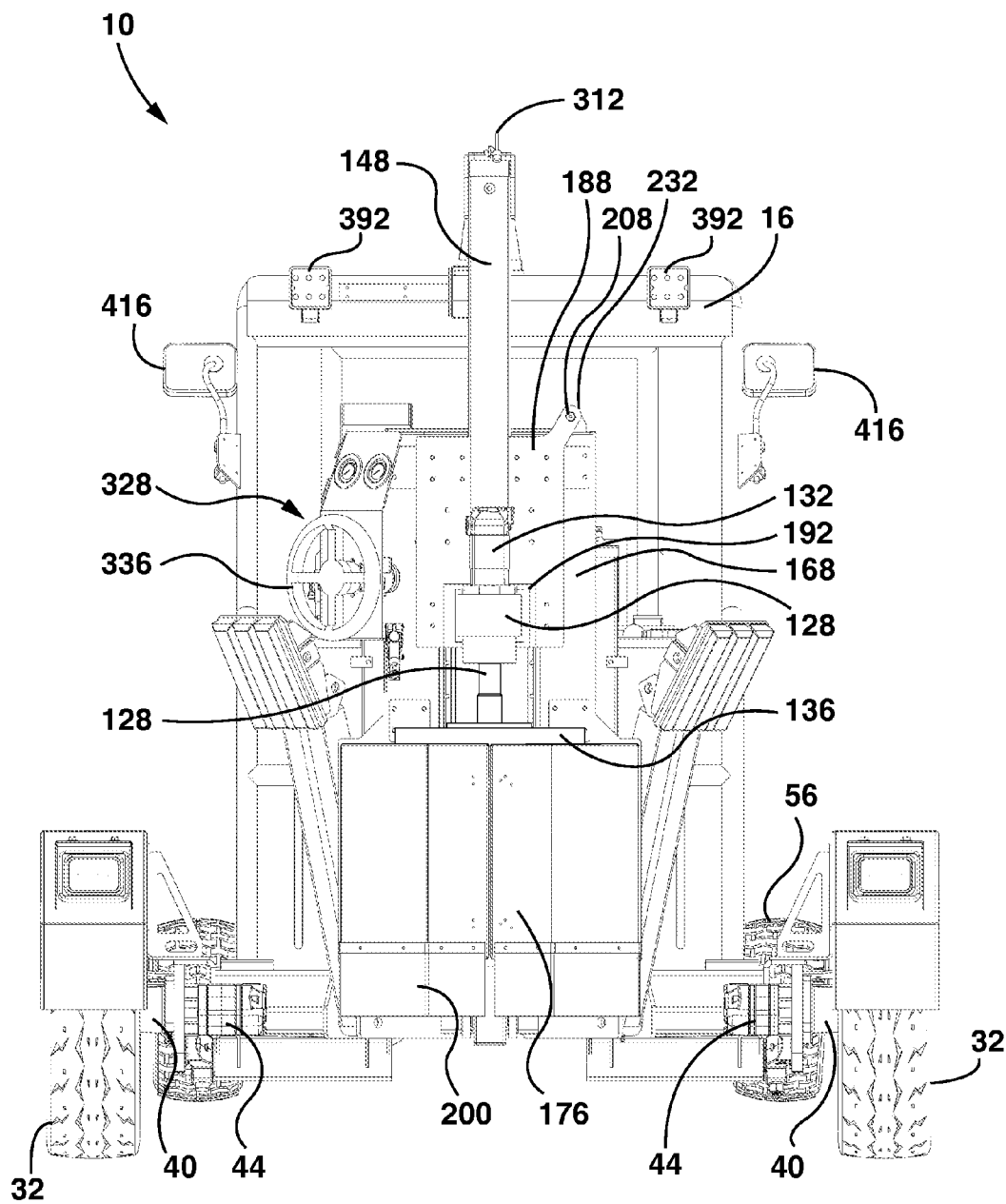
FIG. 4 is a front view of the apparatus in the towing configuration.
Figure 5:
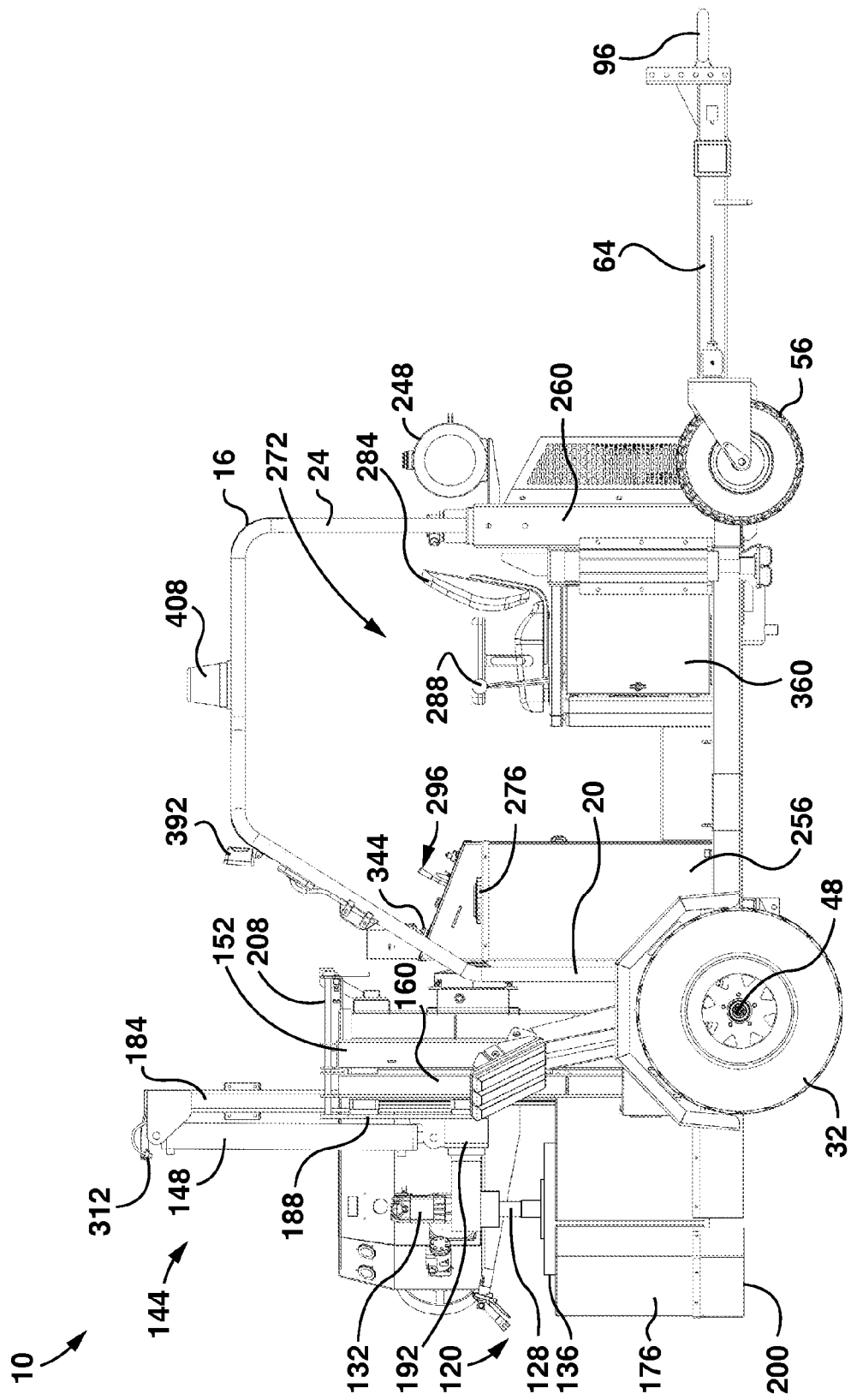
FIG. 5 is a left side view of the apparatus in a driving configuration.
Figure 6:
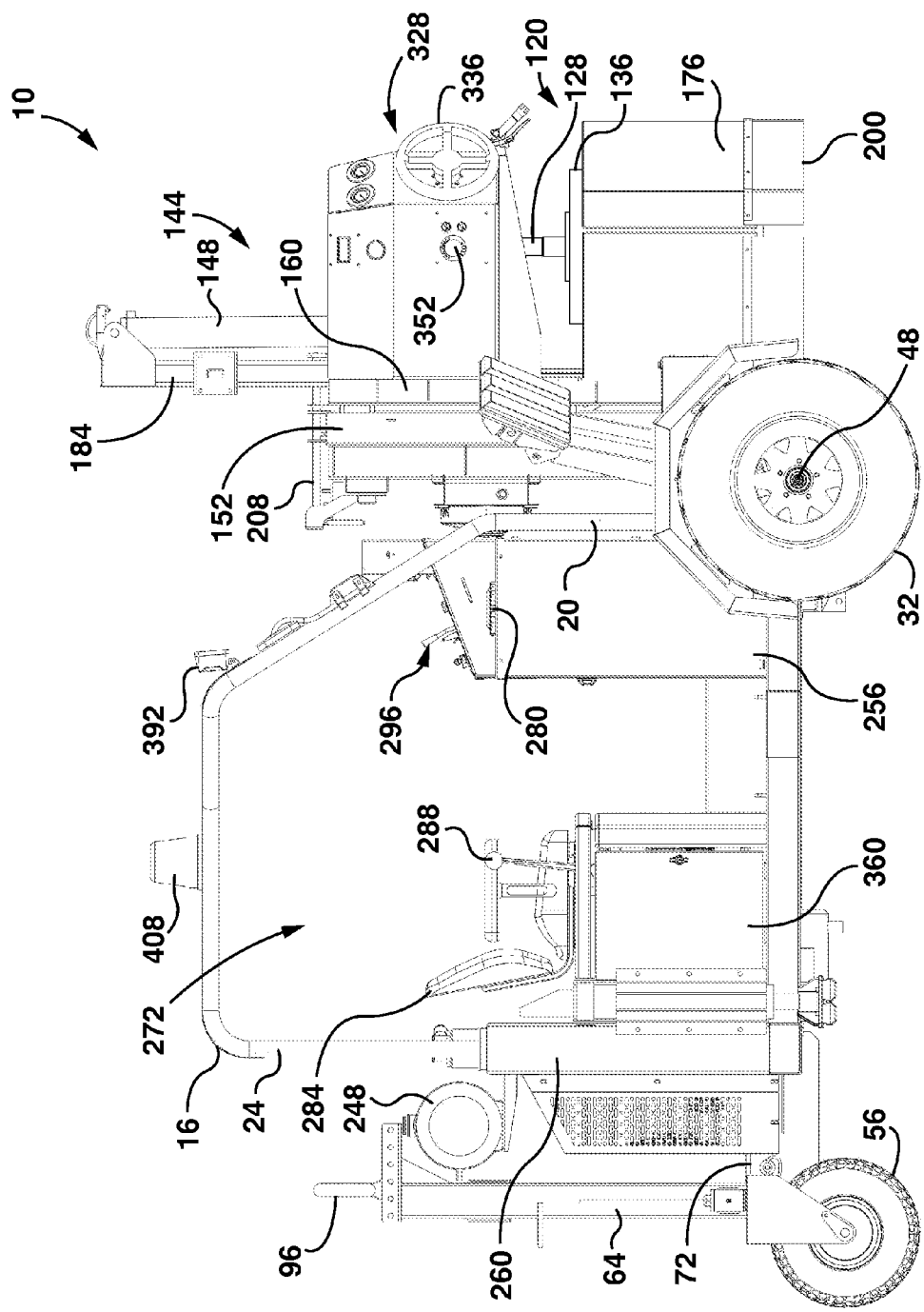
FIG. 6 is a right side view of the apparatus in the driving configuration.
Figure 7:
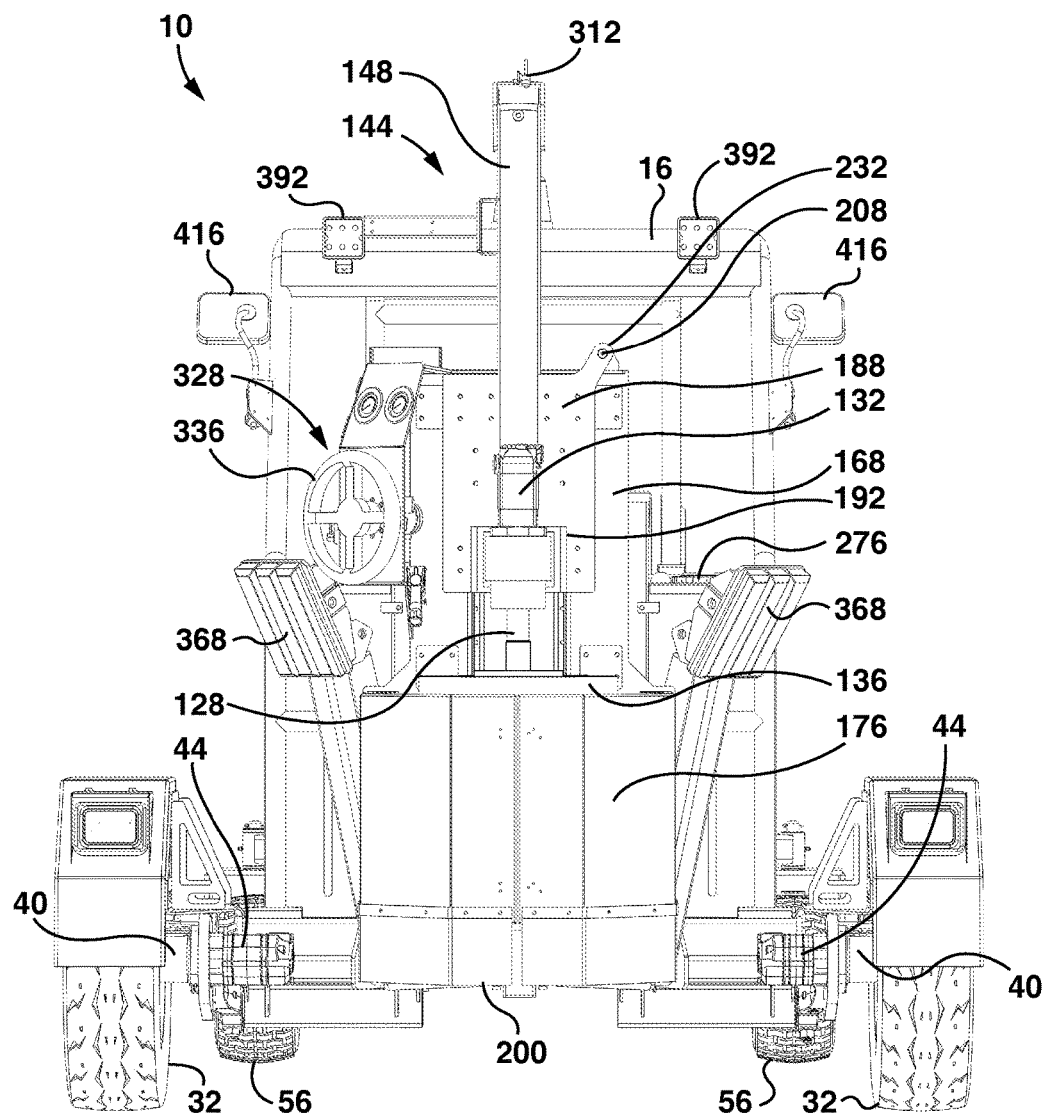
FIG. 7 is a front view of the apparatus in the driving configuration.

The apparatus 10 includes at least one primary wheel 32. In the example illustrated, the at least one primary wheel 32 is arranged towards the forward end 20 of the base structure 16. In the example illustrated, primary axles 40 are positioned on opposing sides of the base structure 16, and the at least one primary wheel 32 consists of first and second primary wheels mounted on the respective primary axles 40 (FIG. 4). Furthermore, a motor 44 is coupled to a hub 48 of each of the primary wheels 32 (FIGS. 1 and 2). The motors 44 may be hydraulic motors.

Each hub 48 of the primary wheels 32 may be a free-wheeling hub that is operable between an unlocked state and a locked state. In the unlocked state, the hub may be decoupled from the motor 44 and the primary wheel 32 is permitted to rotate freely about the primary axle 40. Accordingly, in the unlocked state, the apparatus 10 may be freely moved over a ground surface for towing. In the locked state, the motor 44 may restrict free rotation of the primary wheel 32 about the primary axle 40. Accordingly, in the locked state, displacement of the apparatus 10 over the ground surface may be restricted by the resistance of the motor 44, which may be damaged if the primary wheel 32 is moved, as in towing, while the hub is locked.

For additional safety, an electric over hydraulic brake system may be provided, mounted to the hubs 48. The braking system may be momentarily actuated from a brake switch 50 on a dashboard 52 (FIG. 2) to lock the primary wheels 32 in place relative to the primary axles 40, which may be useful when the apparatus 10 is on an incline. The braking system may also be activated by activating the trailer braking system of a towing vehicle (not shown) when the apparatus 10 is being towed.

In the example illustrated, the apparatus 10 includes at least one secondary wheel 56 arranged towards the rearward end 24 of the base structure 16. In the example illustrated, the at least one secondary wheel 56 consists of first and second wheels mounted on opposing sides of the base structure 16.

Accordingly, in the example illustrated, the apparatus 10 consists of four wheels in total, with two of the primary wheels 32 arranged towards the forward end 20, and two of the secondary wheels 56 arranged towards the rearward end 24. Propulsion is derived from the primary wheels 32, and the primary wheels 32 are also responsible for bearing the mass of the apparatus 10 during towing, whereas the secondary wheels 56 provide support and balance during driving.

In an alternative, three-wheeled configuration, propulsion may be derived from a single, rear-mounted wheel that is driven hydraulically and that may be swiveled to impart direction for the apparatus. In such examples, two wheels may be required to bear the mass of the apparatus during towing, and optionally the single, rear-mounted wheel may be retracted upwardly in a towing configuration.

Figure 3:
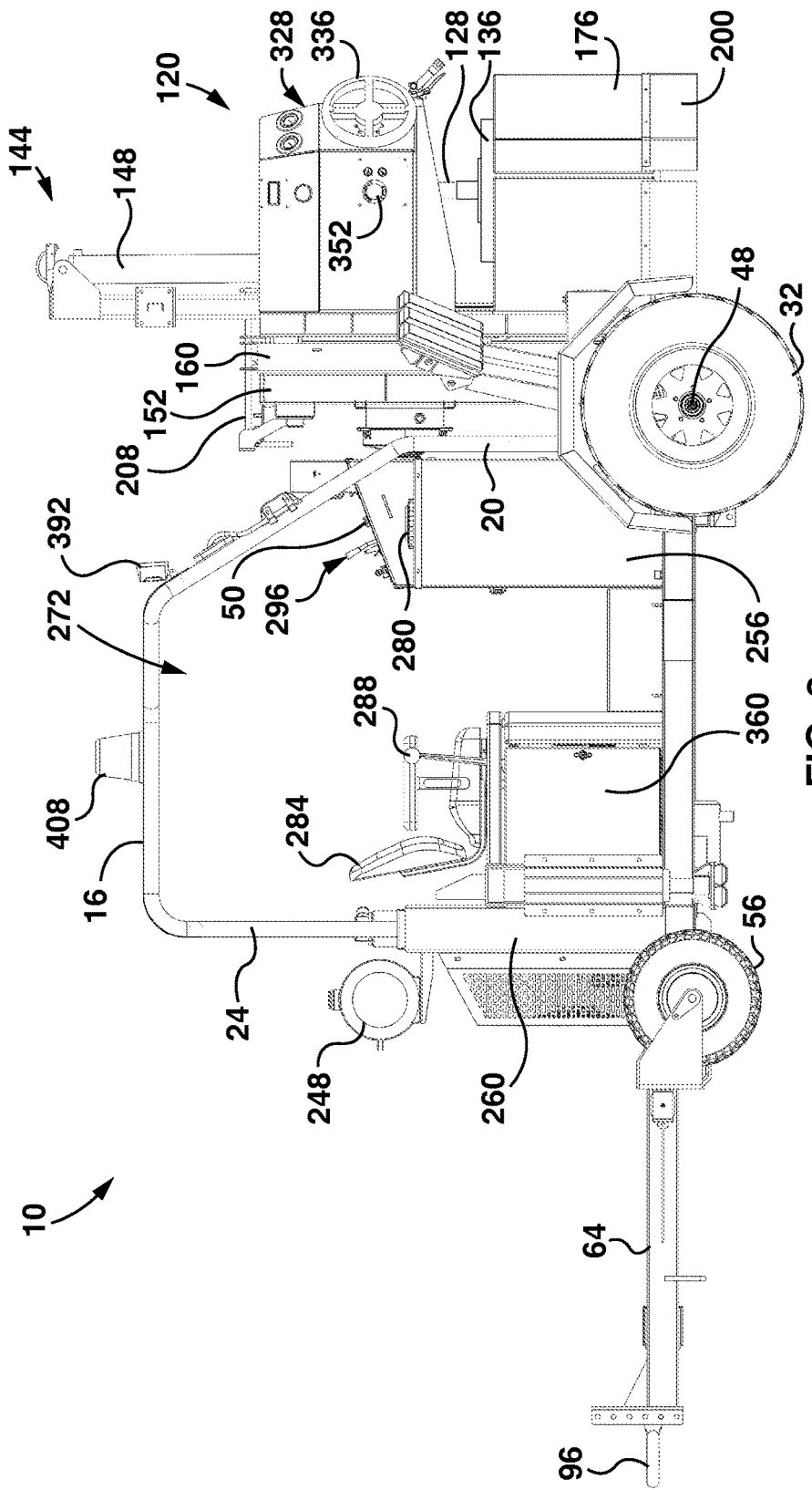
FIG. 3 is a right side view of the apparatus in the towing configuration.

The apparatus 10 further includes a tow member 64 connected to the base structure 16. The tow member 64 is operable for trailering by the towing vehicle. Referring to FIG. 2, the apparatus 10 includes a bracket 72 fixed to the rearward end 24 of the base structure 16. A proximal end of the tow member 64 is pivotally mounted to the bracket 72. A distal end of the tow member 64 is spaced apart from the proximal end. A hitch connector 96 is fixed to the distal end. For example, as illustrated, the hitch connector 96 may be of variable height and include a pintle ring. The hitch connector 96 is attachable to a hitch of the towing vehicle so that the apparatus 10 may be trailered by the towing vehicle. As shown in FIGS. 2 and 3, the tow member 64 has been pivoted to a lowered position.

In the example illustrated in FIGS. 1 and 2, the at least one secondary wheel 56 is coupled to the tow member 64 and is displaced with pivotal movement of the tow member 64. The at least one secondary wheel 56 is coupled to the tow member 64 so that when the tow member 64 is pivoted downwardly to a lowered position, the hitch connector 96 may be attached to the towing vehicle, and the at least one secondary wheel 56 is swiveled upwardly or raised and spaced apart from the ground surface. The tow member 64 is in the lowered position when the apparatus 10 is in a towing configuration (FIGS. 1, 2, 3 and 4), as described herein.

Furthermore, when the tow member 64 is pivoted upwardly away from the lowered position to a raised position, the at least one secondary wheel 56 engages the ground surface. The tow member 64 enters its raised position when the apparatus 10 is in a driving configuration (FIGS. 5, 6, 7 and 8) or a coring configuration (FIGS. 9, 10, 11, 12 and 13), as described herein. In the example illustrated, the tow member 64 pivots downwardly to move from its raised position of the driving or coring configurations to its lowered position of the towing configuration.

Figure 8:
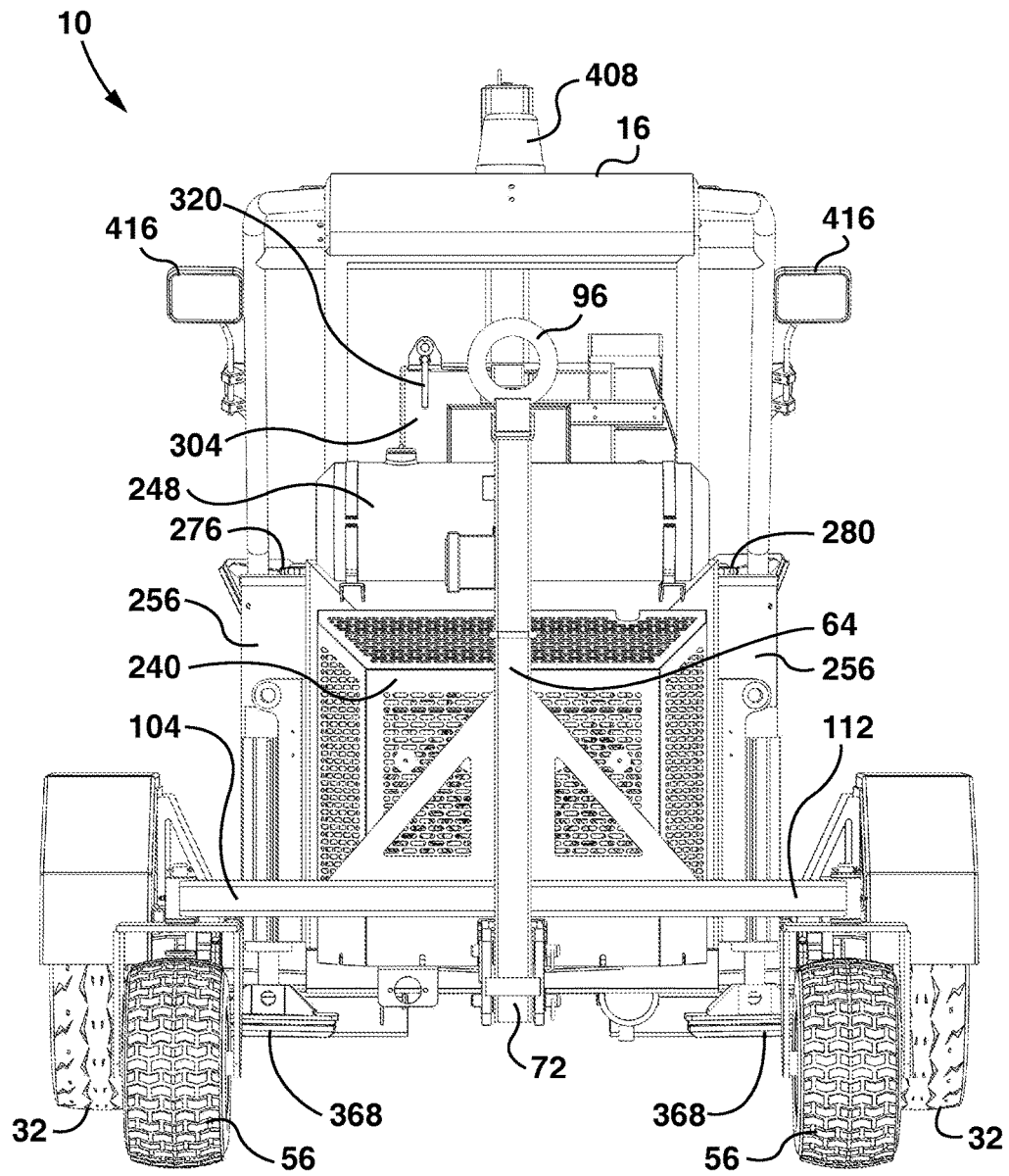
FIG. 8 is a rear view of the apparatus in the driving configuration.
Figure 9:
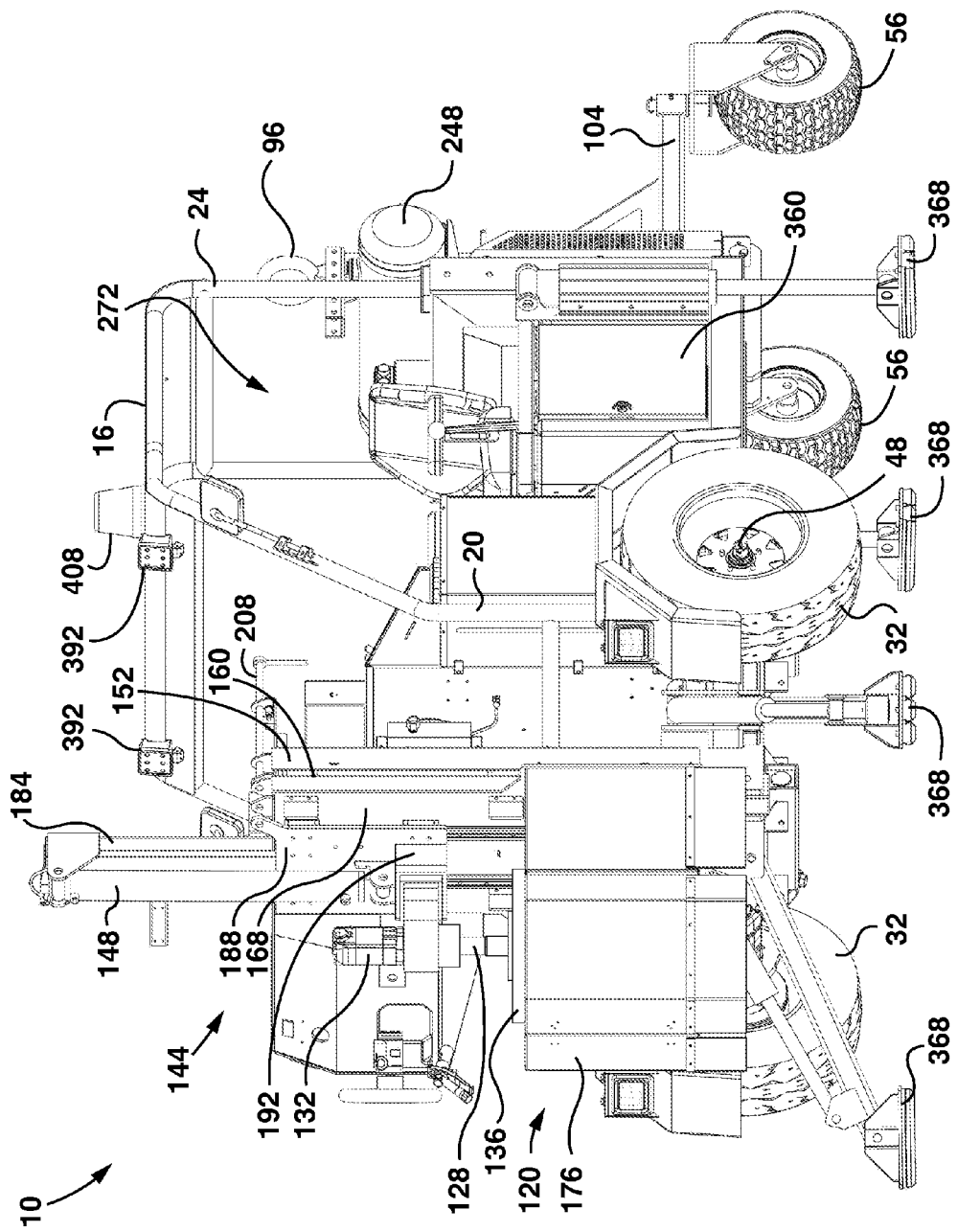
FIG. 9 is a front, left side perspective view of the apparatus in a coring configuration.

Referring to FIG. 8, a first lateral arm 104 and a second lateral arm 112 are fixed to opposing sides of the tow member 64. In the example illustrated, the lateral arms 104, 112 are fixed to the tow member 64 at a location intermediate the proximal and distal ends of the tow member 64, and extend laterally from the elongate tow member 64. The secondary wheels 56 are coupled to the lateral arms 104, 112.

In the example illustrated, the lateral arms 104, 112 are offset from a pivotal axis of the tow member 64 at the connection point between the tow member 64 and the bracket 72. Accordingly, the secondary wheels 56 are displaced in an arc when the tow member 64 is pivoted between its raised position and its lowered position. This displacement allows the secondary wheels 56 to move between the position spaced apart from the ground surface and the position engaging the ground surface.

In some examples, the secondary wheels 56 are swivelly connected to the lateral arms 104, 112. In the example illustrated, when the tow member 64 is in its raised position, the secondary wheels 56 may be swiveled about a substantially vertical axis.

The apparatus 10 further includes a coring subsystem 120 that is operable to make a core within the ground surface supporting the apparatus 10. In the example illustrated, the coring subsystem 120 is connected to the forward end 20 of the base structure 16 and includes a rotary spindle 128 and a motor 132. The motor 132 may be a hydraulic motor. The rotary spindle 128 is attached to a coring element 136. The motor 132 causes the rotary spindle 128 to rotate to drive or spin the coring element 136. In some examples, the coring element 136 may be a core bit or drum, having a diameter of up to 24 inches in diameter, or more.

The apparatus 10 further includes a support mechanism 144 connected to the base structure 16. The support mechanism 144 supports the rotary spindle 128 and the motor 132, and is operable to displace the rotary spindle 128 and the motor 132 upwardly and downwardly relative to the ground surface. In the example illustrated, the support mechanism includes a hydraulic actuator or cylinder 148 for displacing the rotary spindle 128 and the motor 132 upwardly and downwardly relative to the ground surface.

Furthermore, the support mechanism 144 may be operable to securely maintain the rotary spindle 128 in a raised position. In the raised position, the rotary spindle 128 may be at a height above the ground surface that is greater than a height of the coring element 136. In some examples, the support mechanism 144 may maintain the rotary spindle 128 in the raised positon so that the coring element 136 and/or a bottom edge 200 of a coring guard 176 is held at least about 18" above the ground surface.

In the example illustrated, the support mechanism 144 includes a support member 152 that is coupled to the base structure 16 in a fixed manner, and a support member 160 that is slidably mounted to and supported by the support member 152. Displacement of the support member 160 relative to the support member 152 provides a vertical range of motion of the rotary spindle 128, i.e. substantially perpendicular to the ground surface.

In the example illustrated, the coring guard 176 is fixed to a lower portion of the support member 160. The coring guard 176 may contour a space where the coring element 136 is to be received. The coring guard 176 may act to protect the coring element 136, and may act to shield debris thrown from the coring element 136 during a cutting operation. A front of the coring guard 176 may be opened up to expose the rotary spindle 128 and the coring element 136.

In the example illustrated, the support member 160 includes a body portion 168 and a mast portion 184 extending above from the body portion 168. Each of the body portion 168, the mast portion 184 and the coring guard 176 may be connected to one another such that they are displaced together with displacement of the support member 160 relative to the support member 152.

In the example illustrated, the support mechanism 144 further includes a support member 188 that is slidably mounted to the support member 160. The rotary spindle 128 is fixed to the support member 188 by a mount 192 that is also attached to a lower end of the hydraulic actuator 148. Sliding displacement of the support member 188 relative to the support member 160 provides a further vertical range of motion of the rotary spindle 128, i.e. substantially perpendicular to the ground surface.

In the example illustrated, the hydraulic actuator 148 extends downwardly from an upper end that is attached to the mast portion 184 of the support member 160. The sliding movement of a piston relative to a cylinder of the hydraulic actuator 148 provides the displacement of the support member 188 relative to the support member 160. An internal hydraulic actuator or cylinder is arranged between and coupling the support members 160, 152, and is hidden from view. The internal hydraulic cylinder provides the sliding displacement of the support member 160 relative to the support member 152.

Accordingly, in the example illustrated, the rotary spindle 128 may be translated with displacement of the support member 160. Additionally, the rotary spindle 128 may be translated with displacement of the support member 188 independently of displacement of the support member 160.

Referring to FIG. 1, in the example illustrated, the support mechanism 144 further includes a safety member 208 that is operable to engage each of the support members 152, 160, 188 and maintain them in a fixed or locked position with respect to the base structure 16. Accordingly, the safety member 208 may restrict movement of the support member 160 and/or the support member 188 from movement due to hydraulic creep. In the fixed position, as shown, the rotary spindle 128 may be in the raised positon so that the bottom edge 200 of the coring guard 176 is held at least about 18" above the ground surface.

In the example illustrated, the support member 152 includes a tab 216. The safety member 208 projects through an opening in the tab 216. Furthermore, the support member 160 includes tabs 224, 226 extending up from the body portion 168, and the support member 188 includes a tab 232 extending upwardly therefrom. With openings in the tabs 216, 224, 226, 232 in alignment, the safety member 208 may be inserted to project through each, so as to maintain the support members 152, 160, 188 in the fixed position. The safety member 208 may be spring loaded and biased towards the tab 232 to maintain the fixed position.

Figure 12:
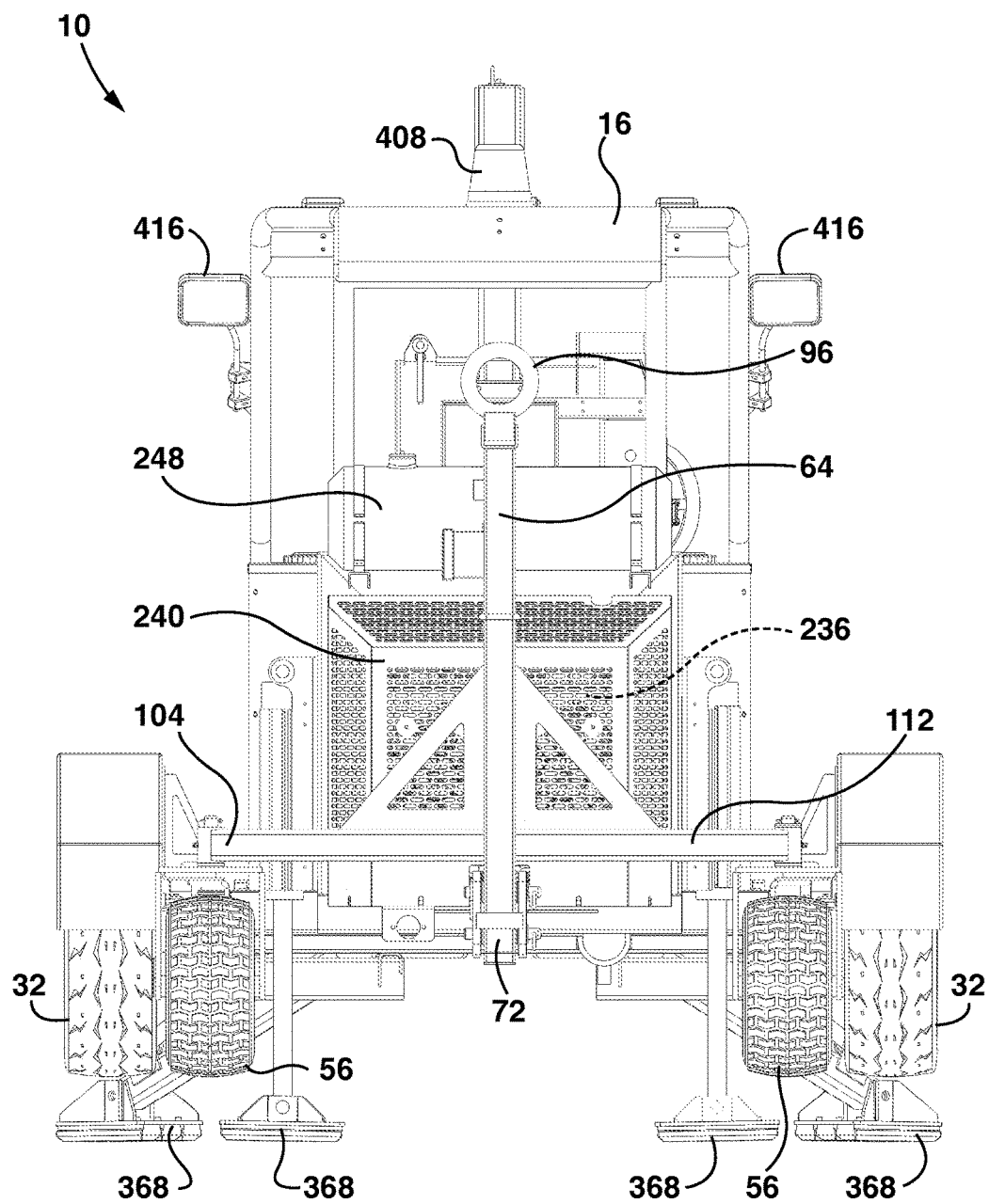
FIG. 12 is a rear view of the apparatus in the coring configuration.
Figure 13:
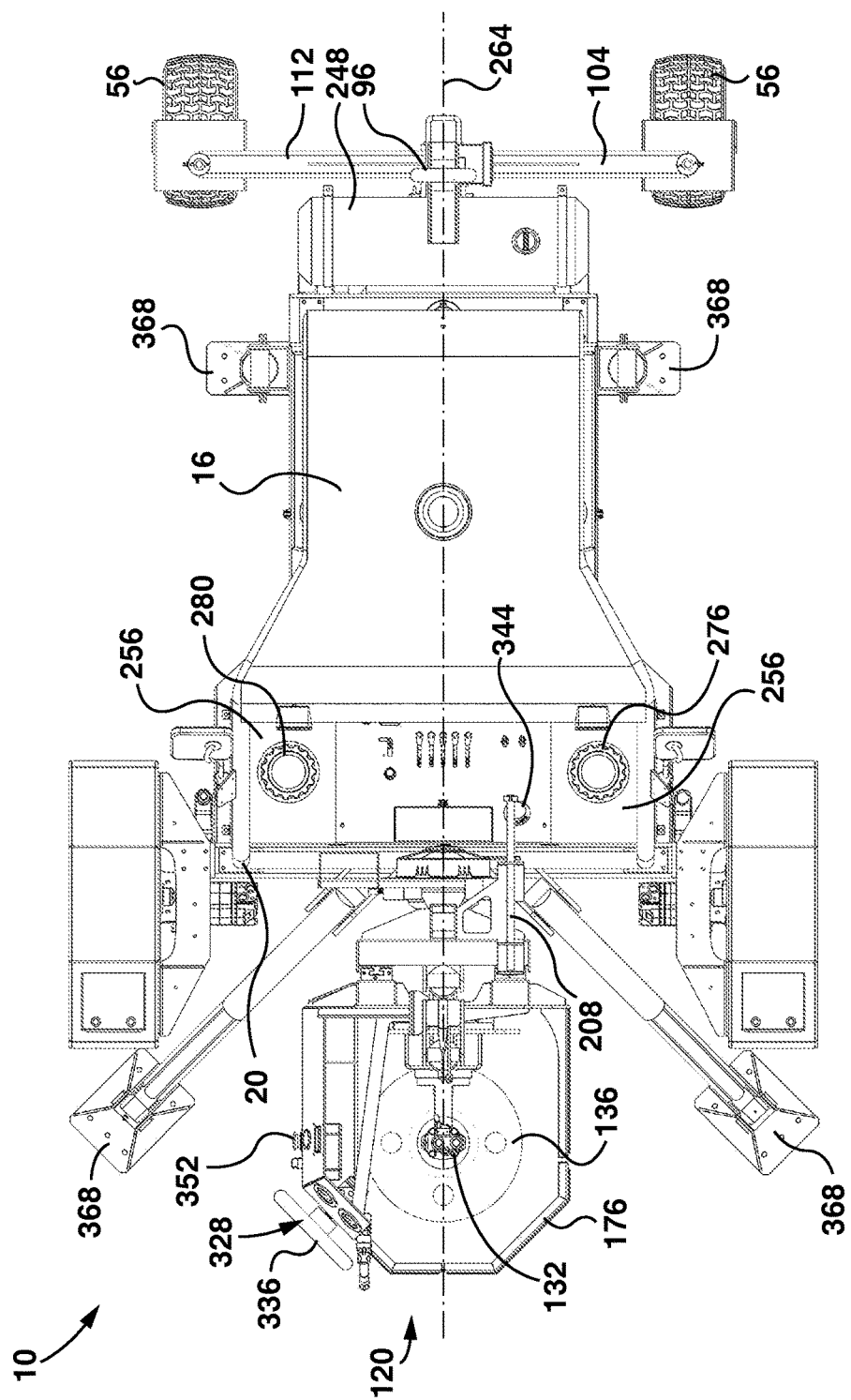
FIG. 13 is a top view of the apparatus in the coring configuration.

Referring to FIG. 12, the apparatus 10 includes at least one engine 236 supported by the base structure 16. The at least one engine 236 is operable to provide power to the primary wheels 32 and the rotary spindle 128. In some examples, as illustrated, the at least one engine 236 may consist of a single engine that provides power to the primary wheels 32 and the rotary spindle 128, and may further provide power to the support mechanism 144. In some examples, the single engine may be an internal combustion engine that is fed by gasoline, diesel, or propane or other fuel.

Power from the at least one engine 236 provided to the primary wheels 32 by the motors 44 causes rotation of the primary wheels 32 to propel the apparatus 10 over the ground surface when the apparatus 10 is in the driving configuration. Power from the at least one engine 236 provided to the motor 132 that drives the rotary spindle 128 causes rotation of the rotary spindle 128 and the coring element 136 attached thereto.

In some examples, the primary wheels 32 may be powered by the engine 236 in a hydrostatic drive propulsion system. Accordingly, the engine 236 may be used to drive one or more pumps that supply pressurized fluid to the motors 44. The hydrostatic drive propulsion system may provide a full range of motion, such as forward and reverse, at a speed up to 5 miles per hour. A cold-start hydraulic by-pass valve may be provided to facilitate fast and easy engine start-up.

Furthermore, in some examples, the rotary spindle 128 may be driven by the motor 132, which may be a hydraulic motor. Accordingly, the engine 236 may be used to drive a pump that supplies pressurized fluid to the motor 44. The engine 236 may also be used to drive a pump that supplies pressurized fluid to the hydraulic actuator 148 and the internal hydraulic actuator (not shown) of the support mechanism 144.

In the example illustrated, the engine 236 is located towards the rearward end 24 of the base structure 16, and may be at least partially located within a driver area 272 defined by the base structure 16. A perforated cover 240 may be used to cover the space where the engine 236 is located and allow ventilation to the engine 236.

A fuel tank 248 for supplying fuel to the engine 236 may also be located at the rearward end 24 of the base structure 16. In the example illustrated, the fuel tank 248 is mounted onto the base structure 16.

The apparatus 10 may further include a water tank 256, which may be positioned proximate to the primary axles 40. In the example illustrated, the water tank 256 includes two side portions, with each positioned directly above a respective one of the primary axles 40. In the example illustrated, a first fill port 276 and a second fill port 280 are provided on opposing sides to facilitate filling of the side portions of the water tank 256.

In the example illustrated, the water tank 256 is arranged to be generally symmetrical about a longitudinal centerline 264 of the base structure 16 (FIG. 13), and a conduit (not shown) may be provided to connect the side portions in fluid communication. Accordingly, water stored within the water tank 256 may be distributed evenly and weight balanced to both sides of the centerline 264.

A hydraulic fluid tank 260 may also be integrated into the base structure 16 and positioned at the rearward end 24, proximate to the engine 236, for supplying the pressurized fluid to the motors 44, the motor 132, the hydraulic actuator 148 and the internal hydraulic actuator.

The base structure 16 defines the driver area 272. The driver area 272 has positioned therein a seat 284, a first control device 288 and a second control device 296. The seat 284 is adapted to receive an operator in a sitting position. As illustrated, the driver area 272 may be provided with a raised floor to provide a stable driving position for the operator. The base structure 16 may act as a protective roll cage to protect the operator sitting in the seat 284. The seat 284 may include various accessories for providing comfort and/or protection to the operator, including, for example, adjustment mechanism(s), arm rests, and/or sound absorbent material to dampen sound from the engine 236.

In the example illustrated, the first control device 288 includes left and right control levers that independently control the forward, neutral and reverse action of their respective primary wheels 32 when in the driving configuration, and are accessed by the operator sitting in the seat 284. Accordingly, the first control device 288 may control both driving and steering of the apparatus 10. In some examples, the first control device may alternatively consist of a single, multi-directional joystick that controls both of the primary wheels 32. Various other configurations may be possible.

In the example illustrated, the second control device 296 includes a plurality of input switches positioned on the dashboard 52, and may also be accessed by the operator sitting in the seat 284. The second control device 296 may control the up and down operation of the support mechanism 144, and up and down operation of a plurality of stabilizers 368, among other things.

In some examples, the engine 236 may form part of a hydrostatic drive system and be arranged to drive three hydraulic pumps. Two of these pumps may be arranged in tandem to provide motive power to the motors 44, and the third may provide hydraulic flow to the motor 132, the hydraulic actuator 148, the internal hydraulic actuator and the stabilizers 368. The direction of flow from the tandem pumps may be controlled by the first control device 288 to drive the motors 44 attached to the primary wheels 32, forward or backward, providing motive power and directionality for the apparatus 10. The flow from the other hydraulic pump may drive the four stabilizers 368, and may be controlled by four dual action control levers of the second control device 296. A fifth control lever of the second control device 296 may be used to lower and raise the support member 160. The support member 188 on which the rotary spindle 128 and the motor 132 are mounted may be raised and lowered by manipulating a wheel 336.

A display 304 is also located in the driver area 272 mounted to the dashboard 52 forwardly of the seat 284. A driver seated in the seat 284 may look at the display 304 while operating the apparatus 10. The display 304 may be operable to display images and/or video captured by a camera 312 mounted on the mast portion 184. The display 304 may be small, LCD video monitor with a durable screen, and the camera 312 may be a small, waterproof and durable. In the example illustrated, the camera 312 is positioned on the mast portion 184 to capture a downward, front-facing view forward of and around the coring element 136. Accordingly, the operator may use the display 304 and the camera 312 to assist with placement and alignment of the coring element 136.

The safety member 208 may also be accessible to the operator seated within the driver area 272. In the example illustrated, a grip portion 320 of the safety member 208 may be reached by the operator, and pulled in a rearward direction to disengage the safety member 208 from the support members 160, 188. The safety member 208 may further include a locking mechanism to maintain it disengaged from the support members 160, 188. In some examples, the safety member 208 may be rotated by manipulating the grip portion 320 to lock it disengaged from the support members 160, 188. Further rotation of the safety member 208 may then release it, whereby the biasing action may move it back to a position of engagement with the support members 160, 188.

In the example illustrated, the engine 236 is positioned below the seat 284. At least one side compartment door 360 may be provided to access the engine 236, and the compartment doors 360 may be lockable. The seat 284 may also be capable of being pivoted forwardly or otherwise moved to provide top access to the engine 236.

In the example illustrated, the apparatus 10 further includes a coring control subsystem 328. The coring control subsystem 328 may be operated by the operator standing in proximity of the coring element 136. As illustrated, the coring control subsystem 328 may include the wheel 336 for controlling vertical displacement of the rotary spindle 128. The coring control subsystem 328 may include additional components for controlling and monitoring the cutting operation.

In the example illustrated, the apparatus 10 includes two emergency stop input devices. Actuation of either of the input devices will stop rotation of the rotary spindle 128. A first emergency stop input device 344 is accessible from within the driver area 272 (FIG. 3). Accordingly, the operator may quickly actuate the first emergency stop input device 344 while being seated in the seat 284. As illustrated, the first emergency stop input device 344 may be positioned adjacent to the second control device 296. A second emergency stop input device 352 may be positioned in proximity of the support mechanism 144, as part of the coring control subsystem 328. Accordingly, the operator may quickly actuate the second emergency stop input device 352 while interacting with the coring control subsystem 328.

In the example illustrated, the apparatus 10 includes the plurality of stabilizers 368. Each of the stabilizers 368 is operable to move between a stabilizing position and a raised position. In the stabilizing position, each of the stabilizers 368 engages the ground surface to absorb or counteract forces created by the coring element 136 during the cutting operation. In the raised position, each of the stabilizers 368 is disengaged from the ground surface, permitting the apparatus 10 to be driven or towed.

The apparatus 10 may further include various additional components to improve safety and/or assist operation.

Figure 10:
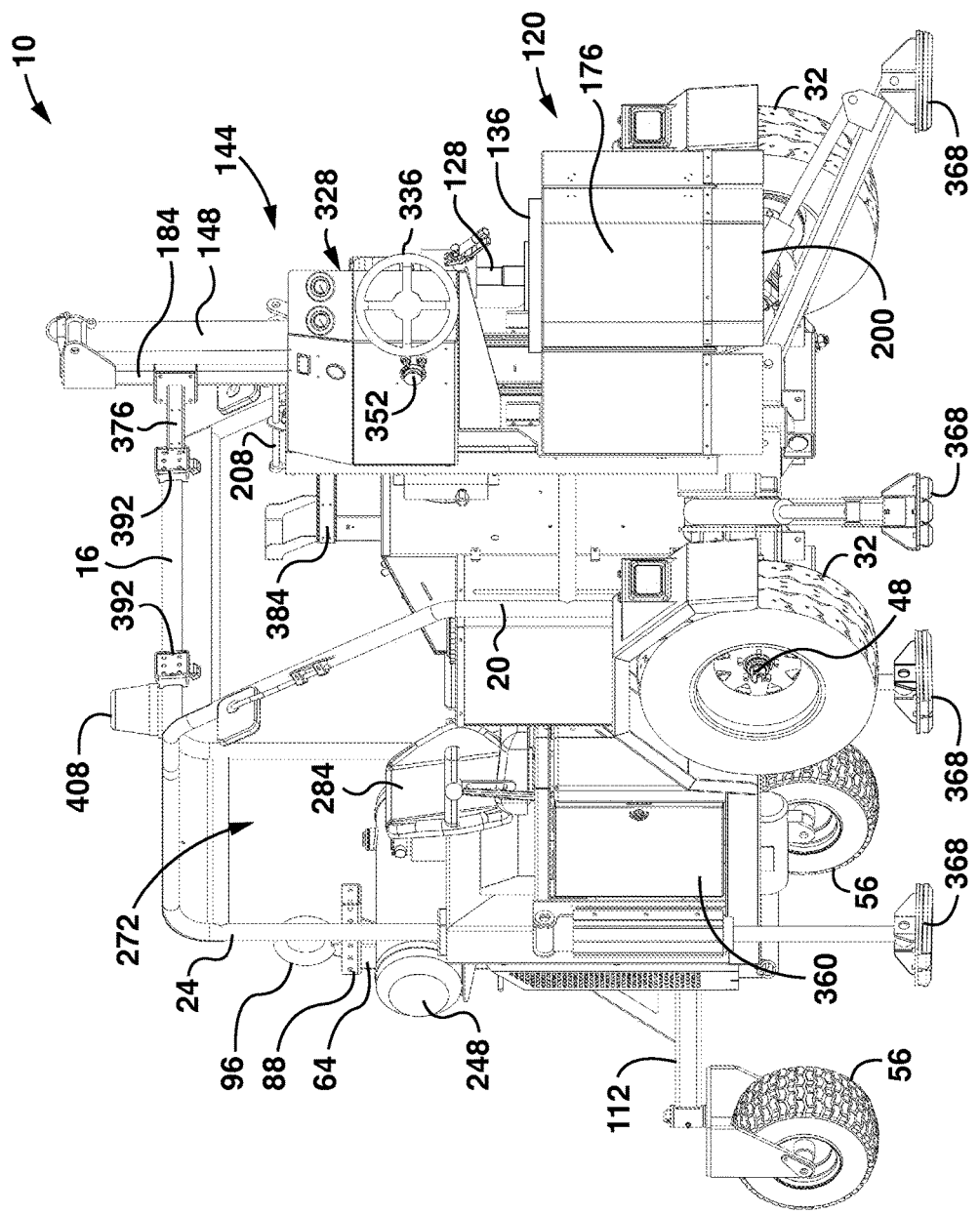
FIG. 10 is a front, right side perspective view of the apparatus in the coring configuration.
Figure 11:
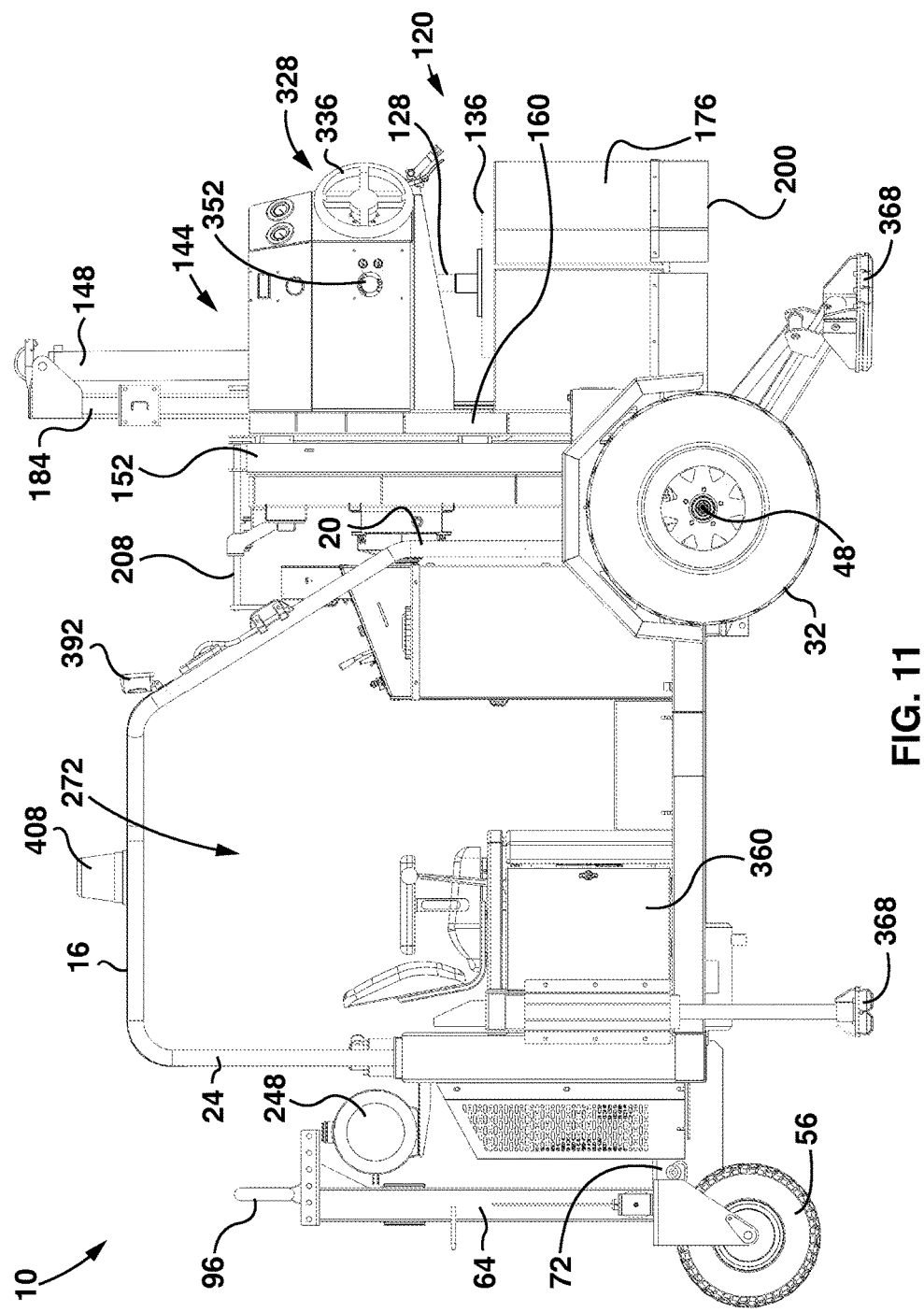
FIG. 11 is a right side view of the apparatus in the coring configuration.

In the example illustrated, first and second gauges 376, 384 are provided (FIG. 10). The first level gauge 376 may be a bi-directional, dual plane (vertical and horizontal) level gauge, and may be positioned at a location that is within a line of sight of the operator interacting with the coring control subsystem 328. The second level gauge 384 may also be a bi-directional, dual plane (vertical and horizontal) level gauge, and may be positioned at a location that is within the line of sight of the operator seated in the seat 284. The level gauges 376, 384 may be used by the operator to ensure proper orientation of the coring element 136 during the cutting operation.

The apparatus 10 may further include one or more work lights 392 for illuminating the work site. The work lights may be adjustable. In the example illustrated, the work lights 392 are mounted towards the forward end 20 of the base structure 16. Furthermore, a beacon 408 is mounted on top of the base structure 16.

One or more rearview mirrors 416 may be mounted onto the side of the base structure 16 to assist the operator while driving the apparatus 10.

As described herein, the apparatus 10 may be operated between the towing configuration (FIGS. 1, 2, 3 and 4), the driving configuration (FIGS. 5, 6, 7 and 8) and the coring configuration (FIGS. 9, 10, 11, 12 and 13).

In the towing configuration, the tow member 64 is pivoted to its lowered position so that the hitch connector 96 may be connected to the towing vehicle. The support mechanism 144 is operated so that the support members 160, 188 are each in their raised position. The safety member 208 engages the support members 160, 188 so that their positions are maintained. The safety member 208 prevents displacement of the support members 160, 188 that may occur due to hydraulic creep.

Furthermore, in the towing configuration, the stabilizers 368 are each operated to their respective raised positions to be disengaged from the ground surface, and the at least one secondary wheel 56 may be spaced apart from the ground surface.

Positioning of the water tank 256 may facilitate tongue weight management during trailering. The center of balance of the apparatus 10 while being trailered may be located in proximity to the primary wheels 32. Accordingly, placement of the water tank 256 near the primary wheels 32 may reduce the influence of the water tank 256 on the tongue weight. The weight of the water tank 256 may fluctuate considerably depending on the amount of water. Furthermore, this fluctuation may occur regularly, as the water tank 256 is typically full before commencing the cutting operation, but will be partially depleted or completely depleted at the end of the cutting operation. Positioning of the hydraulic fluid tank 260 in proximity to the rear of the apparatus may provide a similar benefit to tongue weight management.

In the driving configuration, the tow member 64 is unhitched from the towing vehicle and is pivoted to its raised position. The at least one primary wheel 32 and the at least one secondary wheel 56 are in contact with the ground surface. The support members 160, 188 are maintained in their raised positions, spaced apart from the ground surface. The stabilizers 368 are also maintained in their raised positions.

After engaging or locking the hubs 48, the primary wheels 32 may then be powered by the engine 236 for driving. Accordingly, the apparatus 10 is self-propelled. The operator sitting in the seat 284 of the driver area 272 may drive the coring apparatus by using the first control device 288. Also, while driving, the operator may be monitoring the space in front of the apparatus 10 by looking at the images captured by the camera 312 and displayed on the display 304.

In the coring configuration, the safety member 208 is disengaged from the support members 160, 188 so that the support member 160 may be lowered by the second control device 296 and the rotary spindle 128 may be moved upwardly by operation of the coring control subsystem 328.

To form a core with the coring subsystem 120, after aligning the cutting axis of the coring element 136 with the location to be cored and the safety member 208 released, the support member 160 is first translated downwardly so that the bottom edge 200 of the coring guard 176 abuts the ground surface. The rotary spindle 128 may then be powered to rotate the coring element 136 attached thereto. As the coring element 136 is being rotated, the rotary spindle 128 is further lowered by translation of the support member 188 by operation of the coring control subsystem 328 so that the coring element 136 penetrates the ground surface.

After coring is completed to a desired depth, the support members 160, 188 may be returned to their raised positions, and the safety member 208 reengaged. The stabilizers 368 may be further operated to their raised positions. Accordingly, the apparatus 10 is returned from its coring configuration to its driving configuration. If the coring work is complete, the apparatus 10 may be maneuvered into proximity of the towing vehicle and the stabilizers 368 lowered to support the apparatus 10 so that the secondary wheels 56 may be flipped up into transport position for towing and the tow member 64 downwardly pivoted to its lowered position. Once the tow member 64 is connected to the tow vehicle, the stabilizers 368 retracted, and the hubs 48 on the primary wheels 32 disengaged or unlocked, the apparatus 10 is returned to its towing configuration.

The apparatus 10 as described herein may provide ease of transportation and ease of use. These advantages may be provided due to the apparatus 10 being towable and self-propelled. The apparatus 10 may be towed at highway speeds, and the apparatus 10 may be transported without the use an additional trailer.

In use, the tow member 64 of the apparatus 10 is attached to the towing vehicle. The towing vehicle is driven to a first work site while trailering the apparatus 10. At the first work site, the apparatus 10 is detached from the towing vehicle. The apparatus 10 is then changed to its driving configuration. This may include pivoting the tow member 64 upwardly, which will allow the secondary wheels 56 to engage the ground surface.

The apparatus 10 is then driven about the first work site with the primary wheels 32 being powered by the motors 44. For example, the apparatus 10 may be driven from the location where it is detached from the towing vehicle to a location where a core is to be drilled. The apparatus 10 may be further driven by the operator so as to align the cutting axis of the coring element 136 with the location to be cored.

The apparatus 10 is then changed to its coring configuration. This may include lowering the stabilizers 368, and disengaging the safety member 208 from the support members 160, 188. The rotary spindle 128 of the apparatus 10 is then operated to drive the coring element 136. The support mechanism is also operated to lower the coring element 136 relative to the ground surface, thereby forming a core in the ground.

After forming the core, the apparatus 10 may be changed back to the driving configuration. This may include raising the support members 160, 188, reengaging the safety member 208 with the support members 160, 188, and raising the stabilizers 368. The coring apparatus may then be further driven back to the location of the towing vehicle.

The apparatus 10 is then changed to its towing configuration. This may include pivoting the tow member 64 downwardly, such that the secondary wheels 56 disengage the ground surface, and the tow member 64 is positioned for attachment to a hitch of the towing vehicle. The tow member 64 is then reattached to the towing vehicle. The towing vehicle may be further driven while trailering the apparatus 10 to transport it to a second work site or to a storage area for the apparatus 10.

It will be appreciated that the apparatus 10 may include various electrical cables, hydraulic/pneumatic lines and other power connections for connecting and controlling the motors 44, 132, the engine 236, the hydraulic actuator 148, the internal hydraulic actuator, the stabilizers 368 and/or other components, which have been omitted from the drawings for the sake of clarity.

While the above description provides examples of one or more apparatuses or methods, it will be appreciated that other apparatuses or methods may be within the scope of the accompanying claims.

We claim:

1. A self-propelled, towable coring apparatus, comprising:
   a base structure having a forward end and a rearward end;
   at least one primary wheel arranged to support the base structure;
   a rotary spindle operable for driving a coring element;
   a coring guard operable for shielding debris thrown from the coring element during a cutting operation;
   a support mechanism connected to the forward end of the base structure, the support mechanism supporting the rotary spindle and operable to displace the rotary spindle upwardly and downwardly relative to a ground surface, the support mechanism supporting the coring guard and operable to displace the coring guard upwardly and downwardly relative to the rotary spindle;
   at least one engine supported by the base structure and operable to provide power to (i) rotate the at least one primary wheel to propel the apparatus, and (ii) rotate the rotary spindle to drive the coring element; and
   a tow member connected to the rearward end of the base structure for trailering the apparatus by a towing vehicle.

2. The apparatus of claim 1, comprising a bracket fixed to the rearward end of the base structure, and the tow member comprises a proximal end that is mounted to the bracket, a distal end spaced apart from the proximal end, and a hitch connector fixed to the distal end.

3. The apparatus of claim 2, wherein the at least one primary wheel is arranged towards the forward end of the base structure, and further comprising at least one secondary wheel coupled to the tow member and, in a driving configuration, the at least one primary wheel and the at least one secondary wheel are positioned to engage the ground surface.

4. The apparatus of claim 3, comprising first and second lateral arms fixed to opposing sides of the tow member, and the at least one secondary wheel comprises a first secondary wheel connected to the first lateral arm and a second secondary wheel connected to the second lateral arm.

5. The apparatus of claim 4, wherein the first and second lateral arms are fixed to the tow member intermediate of the proximal and distal ends, and the first and second secondary wheels are swivelly connected to the first and second lateral arms, respectively.

6. The apparatus of claim 5, wherein the tow member is pivotally mounted to the bracket and is pivotable from the driving configuration downwardly to a towing configuration in which the at least one secondary wheel is positioned to be spaced apart from the ground surface.

7. The apparatus of claim 1, wherein the rotary spindle is displaceable by the support mechanism to a raised position in which the rotary spindle is maintained at a height above the ground surface greater than a height of the coring element.

8. The apparatus of claim 7, wherein the support mechanism comprises:
   a first support member fixed to the forward end of the base structure;
   a second support member slidably mounted to and supported by the first support member, and the coring guard is fixed to the second support member; and
   a third support member slidably mounted to and supported by the second support member, and the rotary spindle is fixed to the third support member.

9. The apparatus of claim 8, comprising a safety member for engaging the first, second and third support members in a locked position to maintain the rotary spindle in the raised position.

10. The apparatus of claim 9, wherein the safety member is spring loaded and engages tabs of each of the first, second and third support members.

11. The apparatus of claim 1, comprising first and second primary axles positioned on first and second sides of the base structure, respectively, and the at least one primary wheel comprises first and second primary wheels mounted to the first and second primary axles, respectively.

12. The apparatus of claim 11, wherein each of the first and second primary wheels comprises a hub operable between an unlocked state in which the wheel is permitted to rotate freely and a locked state in which the wheel is not permitted to rotate.

13. The apparatus of claim 12, comprising an electric over hydraulic disc braking system coupled to the hubs for selectively locking the hubs relative to primary axles.

14. The apparatus of claim 11, comprising at least one water tank positioned proximate to the primary axles and generally symmetric about a vertical longitudinal center line of the base structure.

15. The apparatus of claim 1, wherein the base structure defines a driver area having positioned therein a seat, a first control device for controlling driving and steering of the apparatus, a second control device for controlling operation of the support mechanism, a display, and a camera operable to capture images of an area forward of the base structure and communicate the images to the display.

16. The apparatus of claim 1, wherein the at least one engine is located towards the rearward end of the base structure and is operable to provide power to (i) at least one hydraulic motor for rotating the at least one primary wheel to propel the apparatus, (ii) at least one hydraulic motor for rotating the rotary spindle to drive the coring element, and (iii) a hydraulic actuator of the support mechanism for displacing the rotary spindle upwardly and downwardly.

17. The apparatus of claim 16, wherein the at least one engine is operable to provide power to move a plurality of stabilizers between a stabilizing position in which each engages the ground surface and a raised positioned in which each is disengaged from the ground surface.

18. The apparatus of claim 16, wherein the at least one engine consists of a single internal combustion engine.

19. A self-propelled, towable coring apparatus, comprising:
a base structure having a forward end and a rearward end;
first and second primary wheels for supporting the base structure and arranged towards the forward end;
a rotary spindle operable for driving a coring element;
a coring guard operable for shielding debris thrown from the coring element during a cutting operation;
a support mechanism comprising a first support member fixed to the forward end of the base structure, a second support member slidably mounted to and supported by the first support member, and a third support member slidably mounted to and supported by the second support member, the coring guard coupled to the second support member and displaceable upwardly and downwardly relative to the rotary spindle, the rotary spindle coupled to the third support member and displaceable upwardly and downwardly relative to a ground surface;
an engine supported by the base structure and operable to provide power to (i) rotate the at least one primary wheel to propel the apparatus, (ii) rotate the rotary spindle to drive the coring element, and (iii) displace the rotary spindle upwardly and downwardly;
a tow member pivotally mounted to the rearward end of the base structure for trailering the apparatus by a towing vehicle; and
first and second secondary wheels for supporting the base structure and coupled to the tow member,
wherein the tow member is pivotable between a driving configuration in which the first and second secondary wheels are positioned to engage the ground surface and a towing configuration in which the first and second secondary wheels are positioned to be spaced apart from the ground surface.

20. An apparatus, comprising:
a base structure;
a rotary spindle operable for driving a coring element;
a coring guard operable for shielding debris thrown from the coring element during a cutting operation;
a support mechanism comprising a first support member coupled to the base structure, a second support member slidably mounted to and supported by the first support member, and a third support member slidably mounted to and supported by the second support member;
at least one engine supported by the base structure and operable to provide power to rotate at least one wheel to propel the apparatus, and rotate the rotary spindle to drive the coring element; and
a tow member coupled to the base structure for trailering the apparatus by a towing vehicle,
wherein the coring guard is coupled to the second support member and is displaceable upwardly and downwardly relative to the rotary spindle, and
wherein the rotary spindle is coupled to the third support member and is displaceable upwardly and downwardly relative to a ground surface.

* * * * *